United States Patent
Longaker et al.

(10) Patent No.: US 7,668,562 B1
(45) Date of Patent: Feb. 23, 2010

(54) METHOD AND APPARATUS FOR GPS GEOFENCING OF MOBILE TRANSMISSIONS

(75) Inventors: Harold L. Longaker, Houston, TX (US); David Bird, Boulder, CO (US)

(73) Assignee: Trimble Navigation Limited, Sunnyvale, CA (US)

(*) Notice: Subject to any disclaimer, the term of this patent is extended or adjusted under 35 U.S.C. 154(b) by 1036 days.

(21) Appl. No.: 10/829,125

(22) Filed: Apr. 20, 2004

(51) Int. Cl.
*H04B 7/00* (2006.01)

(52) U.S. Cl. .................. 455/522; 455/13.4; 455/69; 455/13.1

(58) Field of Classification Search ............... 455/63.1, 455/67.13, 114.2, 115.1, 123, 111, 186.1, 455/287, 13.1, 13.4, 67.11, 522, 69, 456.1, 455/456.3, 517, 519, 446, 562, 561, 449, 455/71; 342/450, 378; 370/335, 908, 913, 370/338

See application file for complete search history.

(56) References Cited

U.S. PATENT DOCUMENTS

| | | | | |
|---|---|---|---|---|
| 5,095,531 A * | 3/1992 | Ito | ................. | 455/435.3 |
| 5,752,197 A * | 5/1998 | Rautiola | ............. | 455/522 |
| 5,859,839 A * | 1/1999 | Ahlenius et al. | ............. | 370/252 |
| 6,865,169 B1 * | 3/2005 | Quayle et al. | ............. | 370/335 |
| 7,295,855 B1 * | 11/2007 | Larsson et al. | ............. | 455/522 |
| 2002/0077138 A1 * | 6/2002 | Bark et al. | ............. | 455/522 |
| 2002/0082036 A1 * | 6/2002 | Ida et al. | ............. | 455/522 |
| 2002/0082767 A1 * | 6/2002 | Mintz | ................. | 701/117 |
| 2002/0142788 A1 * | 10/2002 | Chawla et al. | ............. | 455/504 |
| 2003/0016174 A1 * | 1/2003 | Anderson | ............. | 342/378 |
| 2003/0045314 A1 * | 3/2003 | Burgan et al. | ............. | 455/517 |
| 2003/0064744 A1 * | 4/2003 | Zhang et al. | ............. | 455/522 |
| 2003/0073435 A1 * | 4/2003 | Thompson et al. | ............. | 455/428 |
| 2003/0119445 A1 * | 6/2003 | Bromham et al. | ............. | 455/39 |
| 2004/0017311 A1 * | 1/2004 | Thomas et al. | ............. | 342/450 |
| 2004/0171352 A1 * | 9/2004 | Maeda et al. | ............. | 455/67.13 |
| 2004/0219927 A1 * | 11/2004 | Sumner | ............. | 455/456.1 |
| 2005/0095985 A1 * | 5/2005 | Hafeoz | ............. | 455/67.11 |
| 2005/0147062 A1 * | 7/2005 | Khouaja et al. | ............. | 370/332 |
| 2008/0014965 A1 * | 1/2008 | Dennison et al. | ......... | 455/456.1 |

* cited by examiner

*Primary Examiner*—Tan Trinh

(57) ABSTRACT

A method and apparatus for geofencing mobile transmissions. The method includes determining a geographic location of a mobile transmitter. Then, a geographic interference contour of the mobile transmitter is determined. The mobile transmitter is operating over a specific frequency at the geographic location. A neighboring service contour is then determined. The neighboring service contour is associated with an FCC license that allows transmissions over a specific channel that includes the specific frequency. The interference geographic contour and the service contour are compared to determine if there is overlapping. Thereafter, transmissions from the mobile transmitter are controlled in order to comply with FCC regulations.

34 Claims, 11 Drawing Sheets

METHOD AND APPARATUS FOR GPS GEOFENCING OF MOBILE TRANSMISSIONS

BACKGROUND OF THE INVENTION

1. Field of the Invention

Embodiments of the present invention relate to the field of satellite positioning systems. More particularly, embodiments of the present invention relate generally to a method and system for geofencing mobile transmissions.

2. Related Art

Low-band VHF frequencies that have previously been reserved for applications such as paging have seen a declining utilization as the demand for increased data rate has caused users to migrate to higher frequencies. However, these higher frequencies are becoming increasingly congested, limiting the areas and times in which data transfer can be made.

The Federal Communications Commission (FCC) grants licenses for the transmission of signals. Authorization by the FCC grants stations to operate in accordance with the rules under the provisions of United States, Title 47 of the Federal Code of Regulations (CFR). Title 47 CFR provides the requirements and conditions for commercial mobile radio service providers. In part, 47 CFR provides regulations applicable to paging at low-band VHF.

There are two classes of paging transmitters. A first class system is based on geographic areas such as Basic Economic Areas (BEAs). The second class system is based on fixed sites. Prior Art FIG. 1 illustrates a map 100 showing both a BEA class system and a fixed site class system for a geographic area defined by southern California. As shown in Prior Art FIG. 1, a BEA 110 is outlined to include San Diego County, Orange County, and the regions near the border of California and Arizona. Also, a BEA 120 is outlined north of BEA 110 to include the cities of Los Angeles, Long Beach, San Bernardino, and Riverside. In addition, Prior Art FIG. 1 illustrates a fixed site class system. Carved out of the BEA 120 is a service area 130 centered at a fixed site transmitter near Long Beach.

In both the BEA class system and the fixed site class system, the holder of their respective FCC license has protection from interference caused by others. For example, the holder of the FCC license is authorized with the exclusive right to establish and expand multiple static stations throughout a paging geographic area (e.g., a BEA or a service area). As such, the holder of the FCC license can transmit on a specified channel allocated for assignment in the paging geographic area. This transmission is granted subject to the conditions that no interference may be caused to existing cochannel stations operated by other licensees within the paging geographic area. Further, no interference may be caused to existing or proposed cochannel stations of other licensees in adjoining paging geographic areas.

In the fixed site system, each transmitter has a service area and at a further distance from the antenna, an interference area. As shown in Prior Art FIG. 1, the dotted circle about the site near Long Beach outlines the service area 130 for that transmitter. The FCC rules state that other transmitters, including mobile transmitters, on the same frequency cannot have their interference contours inside the service contour of the licensed transmitter associated with the service area 130.

In the geographic based system, the holder or owner of the FCC license for a BEA can place transmitters anywhere within the BEA provided the interfering contours do not extend into the service areas of existing site licenses or adjacent BEAs. As shown in Prior Art FIG. 1, the BEA 120 outlines a geographic area within which there cannot exist interference contours from other transmitters, including mobile transmitters, operating on the same licensed frequency granted for broadcast within the BEA 120.

As a result, conventional application of the FCC rules for paging broadcasts provides for non-interference of paging signals over a specific licensed channel within a geographic BEA or service area.

A mobile paging transmitter falls under the BEA category. Mobile transmitters have application for enhancing coverage in critical areas where the current fixed pager transmitters provide insufficient coverage, or in the case where a fixed transmitter suffers an outage and service can be restored by use of a mobile transmitter.

Mobile transmitters thus have the capability for being located wherever needed, and therefore also have the capability for causing interference to paging systems in adjacent service areas. Thus there is a need for being able to ascertain their interference potential and to be able to implement corrective action to prevent such interference.

SUMMARY OF THE INVENTION

Accordingly, various embodiments of the present invention disclose a method and system for geofencing mobile transmissions. As a result, embodiments of the present invention are capable of allowing transmission from mobile transmitters that provide a level of protection from cochannel interference to licensed users within a geographic area. In addition, embodiments of the present invention provide the above benefits and also provide for mobile paging broadcasts over a specific cochannel that does not interfere with paging signals over a specific licensed channel within a geographic BEA or service area. Further embodiments of the present invention provide the above benefits and also provide for communication over under-utilized low band VHF frequencies.

In one embodiment, a method for geofencing mobile transmissions is disclosed and includes determining a geographic location of a mobile transmitter. A geographic interference contour of the mobile transmitter is then determined. The mobile transmitter is operating over a specific frequency and transmitting from the geographic location. A neighboring service contour is then determined. The neighboring service contour is associated with an FCC license that allows transmissions over a specific channel that includes the specific frequency. The interference geographic contour and the service contour are compared to determine if there is overlapping. Thereafter, transmissions from the mobile transmitter are controlled in order to comply with FCC regulations.

In another embodiment, a method for geofencing mobile transmissions is described. The method includes determining a geographic location of a mobile transmitter. The mobile transmitter transmits signals over a specific frequency. Thereafter, a database of prohibited locations for transmissions is accessed. The database of prohibited locations is provided to avoid possible interference of transmissions with licensed transmissions in a neighboring geographic area. The neighboring geographic area is associated with an FCC license that authorizes the transmission of broadcast signals over a specific channel that includes the specific frequency. Then, the method determines if the geographic location is included within the database of prohibited locations. If the geographic location is included within the database of prohibited locations, transmissions from the mobile transmitter are disabled. Otherwise, if the geographic location is not included within the database of prohibited locations, transmissions from the mobile transmitter are enabled. Conversely, the database could also consist of allowed locations. It could be derived with the converse rules and methods. With such a database, if the geographic location is included within the database, transmissions from the mobile transmitter are enabled.

In still another embodiment, a system is disclosed that is capable of geofencing mobile transmissions. The system comprises a global positioning receiver that determines a geographic location of a mobile transmitter. The mobile transmitter is capable of transmitting over a specific frequency. The system also comprises an interference calculator that determines a geographic interference contour of the mobile transmitter that is assumed to be operating over a specific frequency at the geographic location. The system also comprises a map database that provides information describing a neighboring service contour. The neighboring service contour is associated with an FCC license to operate over a specific channel that includes the specific frequency. The system also comprises a comparator for determining if the interference geographic contour and the neighboring service contour overlap. The system also comprises a controller that controls transmissions from the mobile transmitter in order to comply with FCC regulations. The kinds of control available in a mobile transmitter include 1) on/off control whereby the transmission is just terminated, 2) adjustable power control whereby the transmit power is adjusted to reduce the range of the interference contours, and 3) controlling the time of transmission to avoid causing interference.

BRIEF DESCRIPTION OF THE DRAWINGS

Prior Art

DETAILED DESCRIPTION OF THE INVENTION

Figure 1:
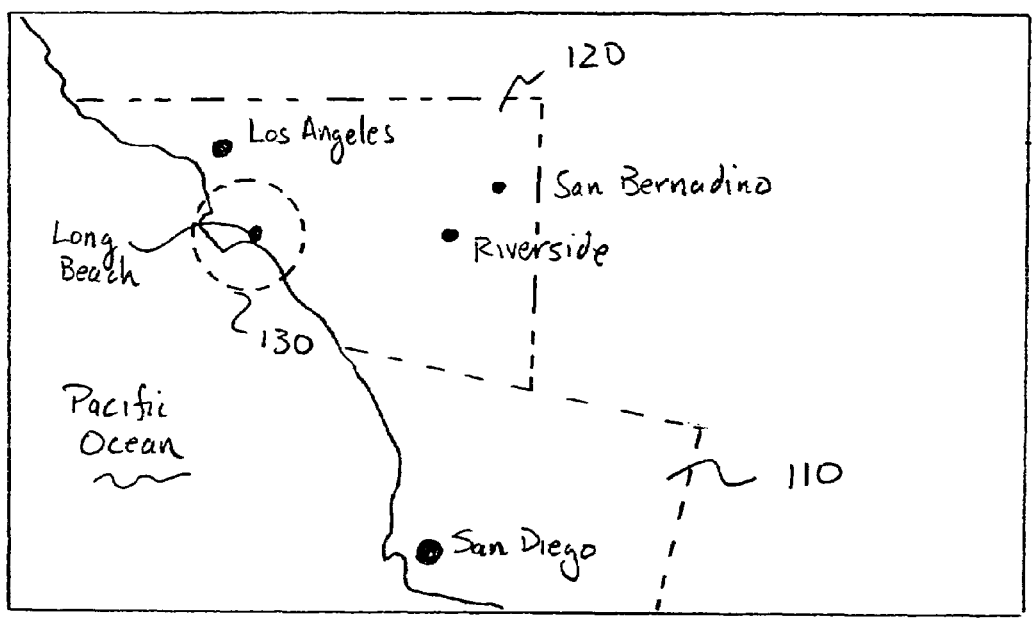
FIG. 1 is a map illustrating a geographic area class system and a fixed site class system used for controlling paging transmitters.

Reference will now be made in detail to the preferred embodiments of the present invention, a method and system for geofencing mobile transmissions, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions that follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining," "calculating," "controlling," "accessing," "disabling," "enabling," or the like, refer to the action and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Figure 2A:
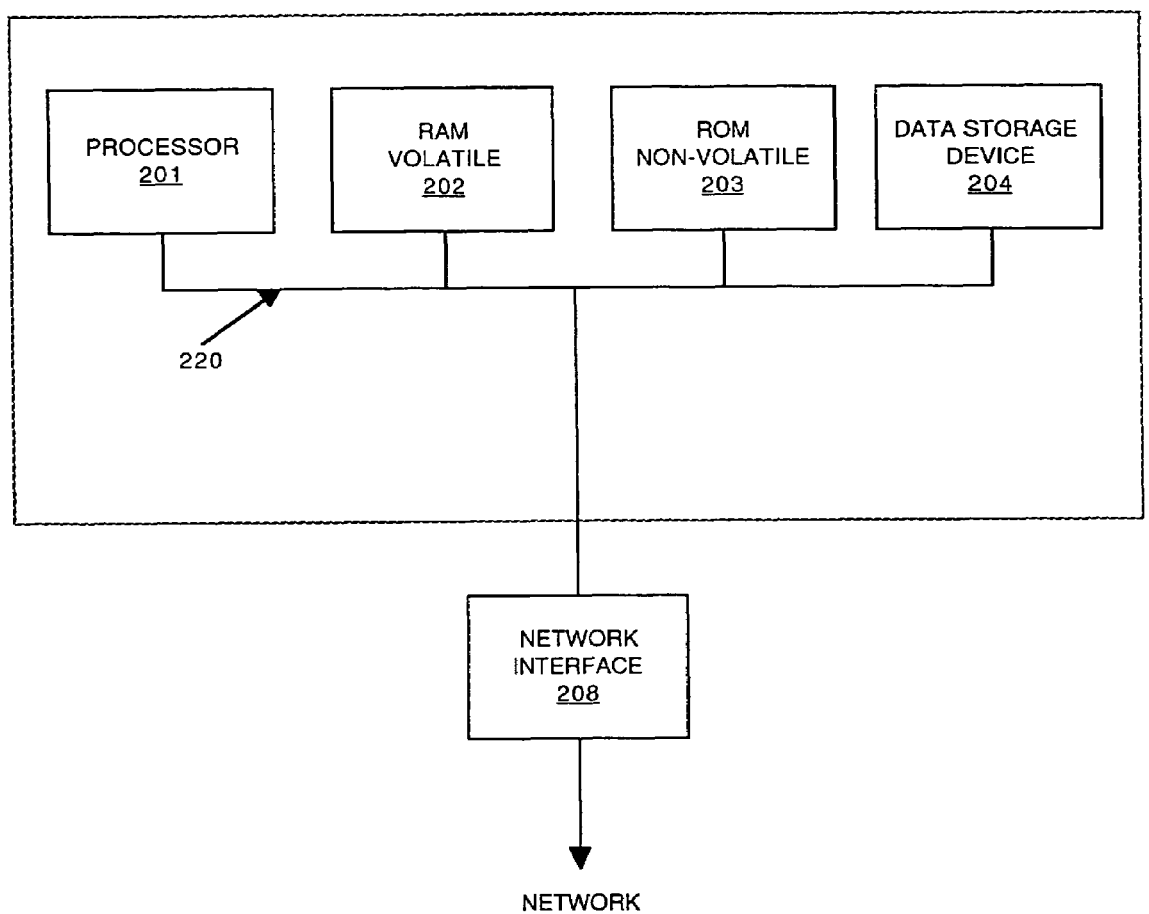
FIG. 2A is a block diagram of a computer system that is capable of geofencing mobile transmissions, in accordance with one embodiment of the present invention.

Referring now to FIG. 2A, embodiments of the present invention may be comprised of computer-readable and computer-executable instructions that reside, for example, in computer-readable media of a computer system that is capable of geofencing mobile transmissions to avoid interference with licensed transmissions over a channel within a geographic area or transmission area. That is, embodiments of the present invention can be implemented on software running on a computer system.

FIG. 2A is a block diagram of exemplary embedded components of such a computer system 200A upon which embodiments of the present invention may be implemented. The computer system can be an embedded system, a personal computer, notebook computer, server computer, mainframe, networked computer, handheld computer, personal digital assistant, workstation, and the like. The elements of the present invention may be distributed among one or more computer systems as described in FIG. 2A.

Exemplary computer system 200A includes an internal address/data bus 220 for communicating information, a processor 201 coupled with the bus 220 for processing information and instructions, a volatile memory 202 (e.g., random access memory (RAM), static RAM dynamic RAM, etc.) coupled with the address/data bus 220 for storing information and instructions for the processor 201, and a non-volatile memory 203 (e.g., read only memory (ROM), programmable ROM, flash memory, EPROM, EEPROM, etc.) coupled to the address/data bus 220 for storing static information and instructions for the processor 201. Computer system 200A may also include various forms of data storage devices 204 for storing information.

With reference still to FIG. 2A, an optional network interface 208 is coupled to address/data bus 220 for providing a communication link between computer system 200A and a network environment. The computer system 200A is coupled to a network using the network connection, network interface 208.

Figure 2B:
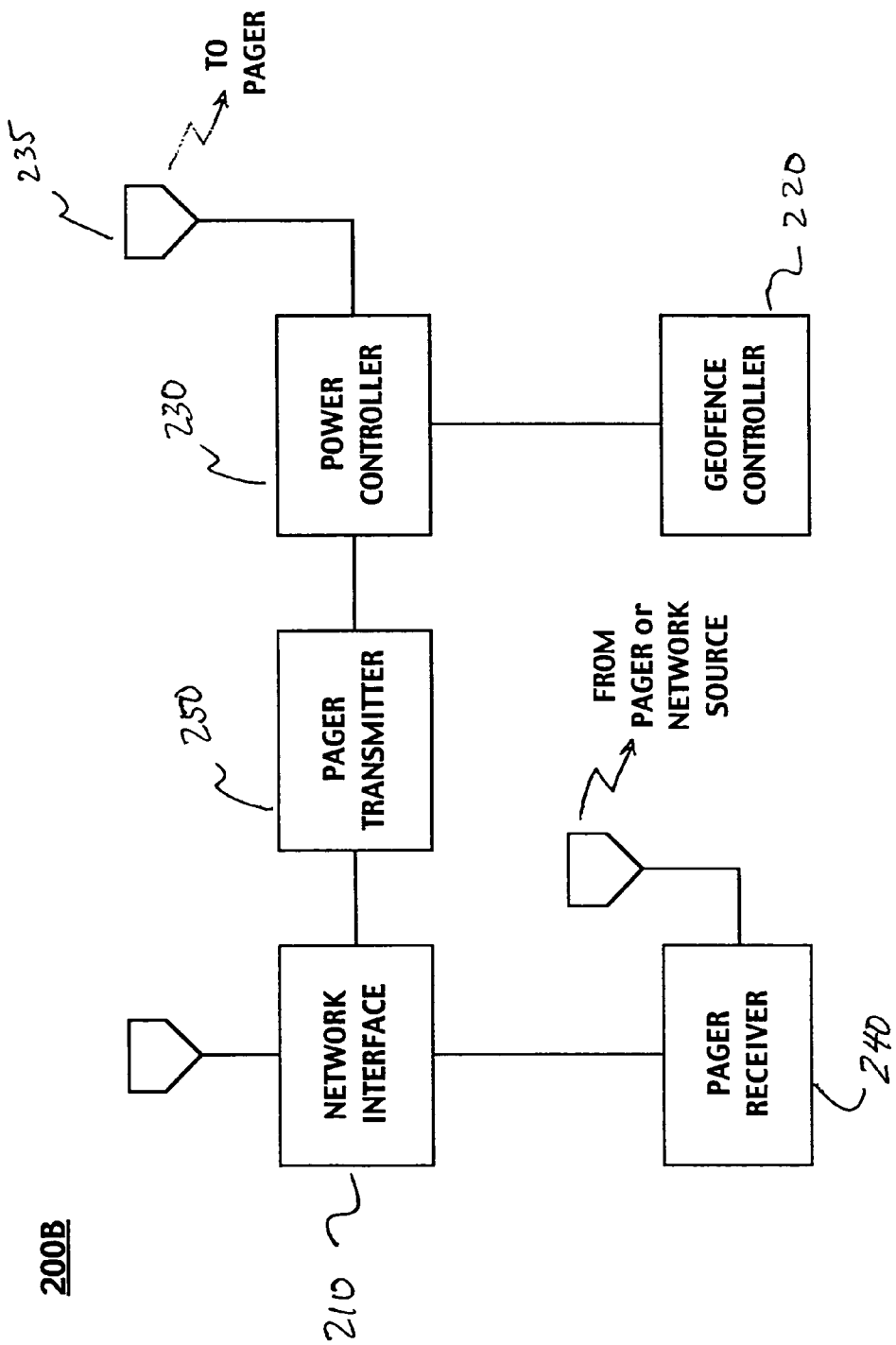
FIG. 2B is a block diagram of a mobile

FIG. 2B is a block diagram illustrating a mobile paging transmitter 200B that is capable of geofencing mobile transmissions to avoid interference with licensed transmissions over a channel within a geographic area or transmission area, in accordance with embodiments of the present invention. The mobile system 200B includes a network interface 210, pager transmitter 250, power controller 230, geofence controller 220, and a pager receiver 240.

The network interface 210 is coupled to a computing system (not shown) for generating or routing signals for transmission. The network interface provides a communication link to a network environment. In one embodiment, the network interface interacts with the computing system (not shown) to retransmit signals from a network source. The signals from the network source are received by the mobile paging transmitter 200B through the pager receiver 240. In this manner, the mobile paging transmitter 200B can enhance coverage in critical areas where current fixed pager transmitter provide insufficient coverage, or restore paging service in the case where a fixed transmitter suffers an outage.

In the configuration as shown in FIG. 2B, a two-way paging system can be implemented, in accordance with one embodiments. In this way, the pager receiver is capable of receiving signals from various remote two-way pagers in the network environment.

As shown in FIG. 2B, the pager transmitter 250 transmits the signals from the network interface 210 to the network environment through the antenna 235. For instance, the pager transmitter 250 transmits the signals at a certain frequency and at a constant transmit power level.

The power controller 230 is capable of varying the transmit power of the signal being transmitted to the network environment from the pager transmitter 250. As a result, the power controller 230 is able to control the range over which the signal from the pager transmitter 250 is received.

The geofence controller 220 directs the power controller 230 in varying the power level of the signal being transmitted to the network environment from the pager transmitter 250. In one embodiment, the geofence controller 220 is analogous to the computer system 200A of FIG. 2A. The geofence controller 220 is able to determine the level of power depending on the transmission environment the mobile paging transmitter 200B is located.

Power level control of the signal being transmitted to the network environment from the pager transmitter 250 as applied by the power controller 230 include the following: 1) on/off control whereby the transmission is terminated; 2) adjustable power control over the signal strength of the signal being transmitted to the network environment from the pager transmitter 250, whereby the transmit power is adjusted to increase or reduce the range of the interference contour associated with the mobile paging transmitter 200B to avoid interference with licensed transmissions over a channel within a geographic area or transmission area; and 3) controlling the time of transmission to avoid causing interference with licensed transmissions over a channel within a geographic area or transmission area, as will be explained in full below.

In this manner, in one embodiment, mobile transmitters can supplement the service provided by a fixed transmission paging network. In another embodiment, mobile transmitters operate independently of the service provided by a fixed transmission paging network. In either case, the service provided by the mobile transmitters do not interfere with the primary purpose of the paging service provided by the fixed transmission paging network.

Exemplary Paging Network

FIGS. 3-6 provide block diagrams of paging systems within which embodiments of the present invention may be implemented. That is, geofencing of mobile transmissions may be implemented within the paging systems as described in FIGS. 3-6. Although embodiments of the present invention are described in relation to paging systems, other embodiments of the present invention are well suited to implementation within other systems that enable communication over low band VHF frequencies.

Figure 3:
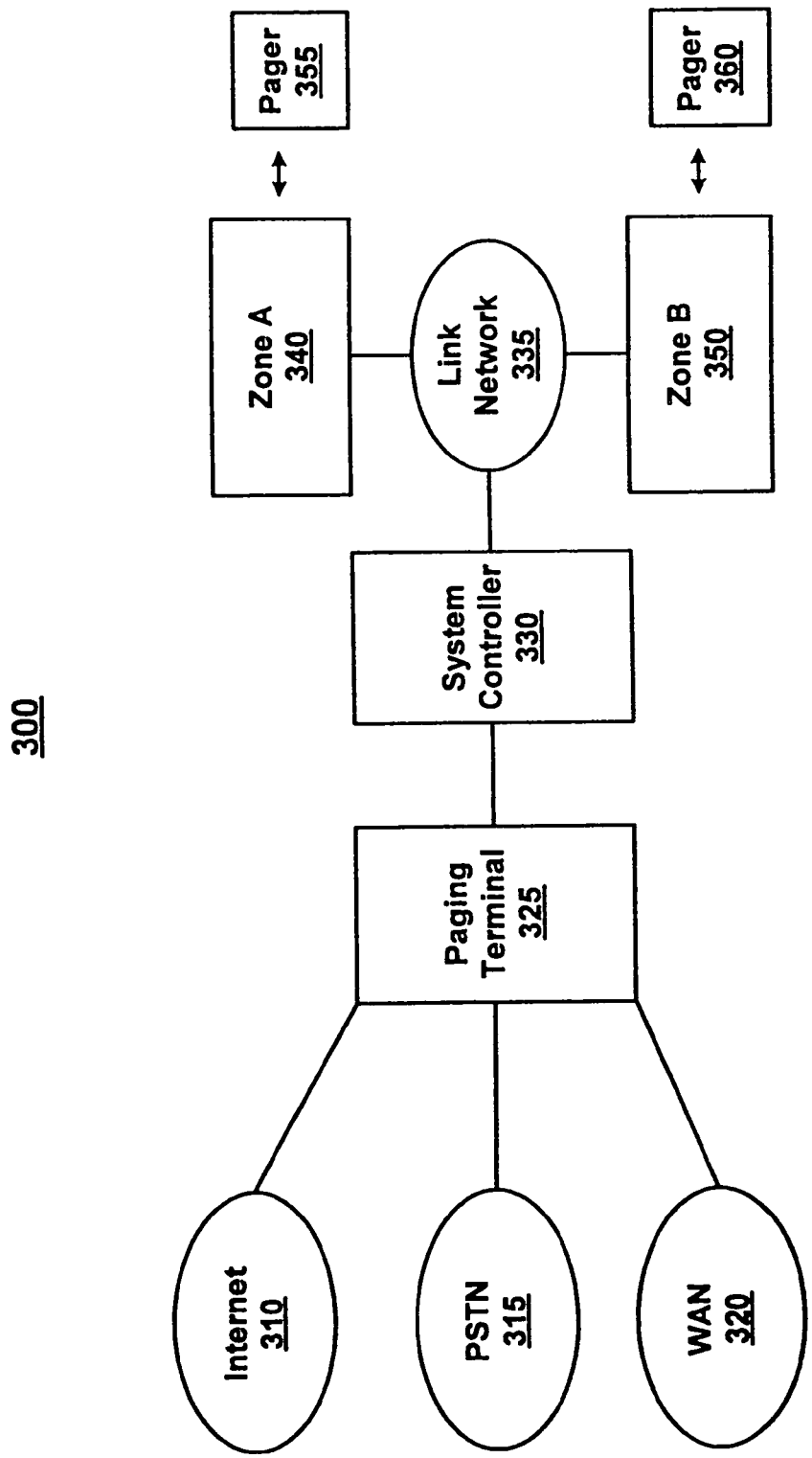
FIG. 3 is a block diagram of a paging system, in accordance with one embodiment of the present invention.

FIG. 3 shows an example of a paging system 300, in accordance with one embodiment of the present invention. The system elements shown are not all required, and may be included or omitted from different paging systems. A paging terminal 325 is connected to message sources 310, 315, and 320. The message sources provide access to the paging system subscribers, or customers.

The paging terminal 325 is the entry point to the paging system. The paging terminal 325 connects callers to the system, accepts and validates messages, and manages the information flow to the system controller 330. The paging terminal 325 also translates subscriber IDs into capcodes and may provide accounting functions.

The system controller 330 handles the queuing, batching, encoding and scheduling of messages received from the paging terminal 325 for delivery to the link network 335. The link network 335 couples the system controller 330 to the transmitter/receiver sites 340 and 350. The link network 335 may be either wired or wireless, and may be switched or packet based. Since RF bandwidth is a limited resource, the system controller 330 must schedule and route the incoming messages in order to maximize the information flow while minimizing latency.

The messages received from the link network 335 are transmitted by transmitter sites 340 and 350. In general, one-way paging systems will have only a transmitter for communication with a pager device, whereas two-way paging systems will have both a transmitter and receiver.

The transmitter power for the transmitter/receiver sites 340 and 350 may range from less than 100 watts to several hundred watts, depending upon the service area coverage requirements and the regulations applicable to the transmitter.

In the United States, Title 47 of the Federal Code of Regulations (47 CFR) provides the requirements and conditions for commercial mobile radio service providers, as regulated by the Federal Communications Commission (FCC). In particular, 47 CFR, Chapter I, parts 20 and 22 provide regulations applicable to paging at low-band VHF. 47 CFR, Chapter I, parts 20 and 22 and its derivatives are incorporated herein by reference. Paging performed by a system that substantially meets the requirements of 47 CFR, Chapter I, parts 20 and 22 and its derivatives is defined as statutory paging. A broadcast mode that substantially conforms to the requirements of 47 CFR, Chapter I, parts 20 and 22, and its derivatives, is defined as a statutory paging mode.

In addition to embodiments of the present invention that fall into the scope of statutory paging systems, or paging systems that may be operated in a statutory paging mode, a subset of the statutory parameters (e.g. transmitted power, channel bandwidth, and channel center frequency) may be changed to provide a modified statutory paging system or modified statutory paging mode.

Referring again to FIG. 3, pager 355 and pager 360 are typically single frequency devices tuned to their respective transmitters 340 and 350. Pagers are usually only capable of receiving messages, but may also include various levels of two-way messaging.

Each pager has a unique address (capcode) that is used to select the specific device that is to receive a directed message. A pager may also share a multicast address with one or more pagers, allowing a single message to be received by several pagers.

Figure 4:
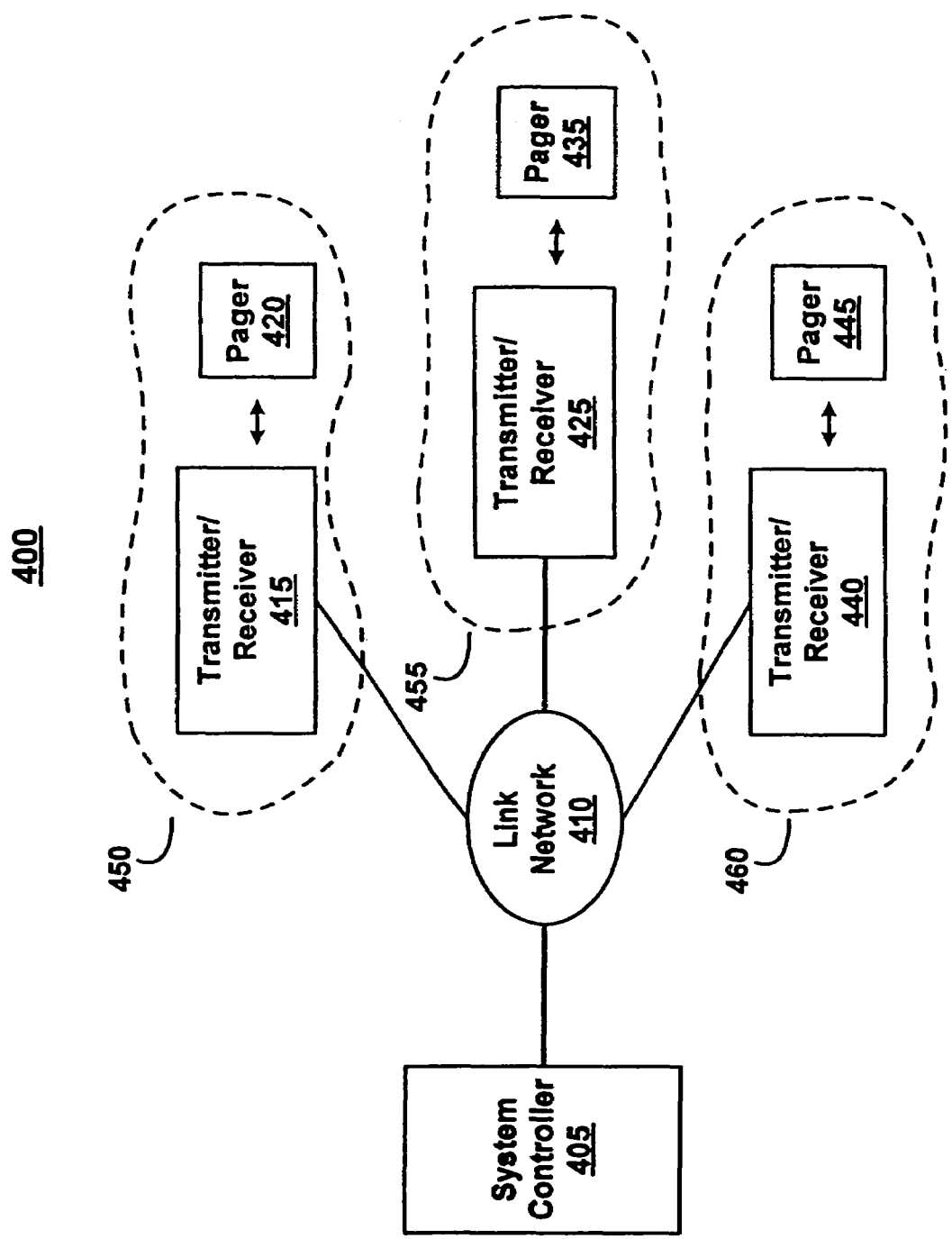
FIG. 4 is a block diagram of a paging system with non-overlapping zones using a single frequency, in accordance with one embodiment of the present invention.

FIG. 4 shows a paging system 400 with system controller 405 and link network 410 serving non-overlapping zones 450, 455, and 460 using a single frequency, in accordance with one embodiment of the present invention. In this system, zones 450, 4555, and 460 are sufficiently separated so that a pager is only able to receive a signal from at most one transmitter, regardless of its location. Different messages may be simultaneously transmitted in each zone without interference.

Figure 5:
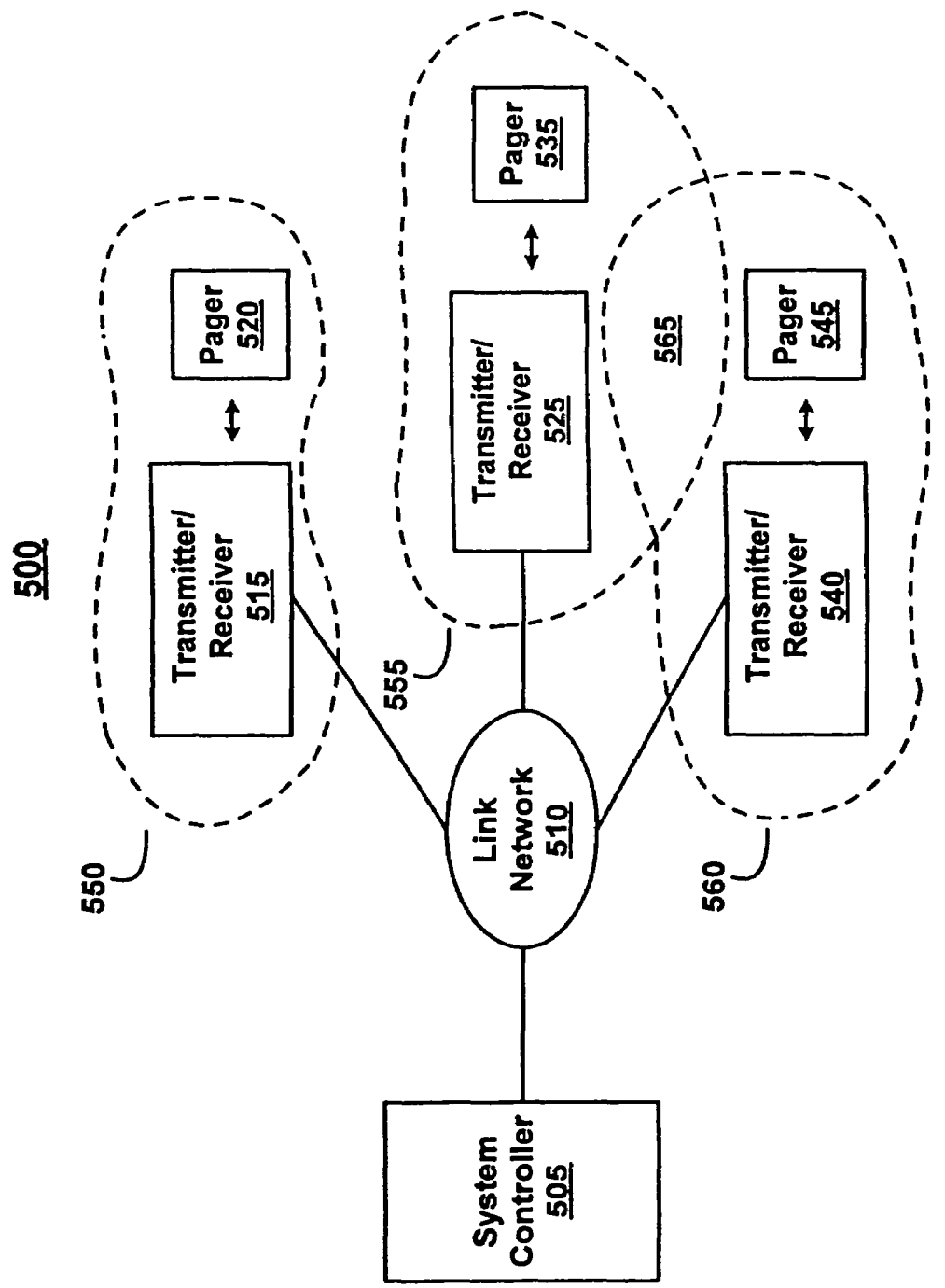
FIG. 5 is a block diagram of a paging system with overlapping zones using two frequencies, in accordance with one embodiment of the present invention.

FIG. 5 shows a paging system 500 system controller 505 and link network 510 serving zone 550 and overlapping zones 555 and 560, in accordance with one embodiment of the present invention. Interference in the overlap area 565 is prevented by using two different frequencies in zones 555 and 560. The two frequencies may be alternated between zone 555 and zone 560 so that pagers tuned to either frequency may receive messages in either zone.

Figure 6:
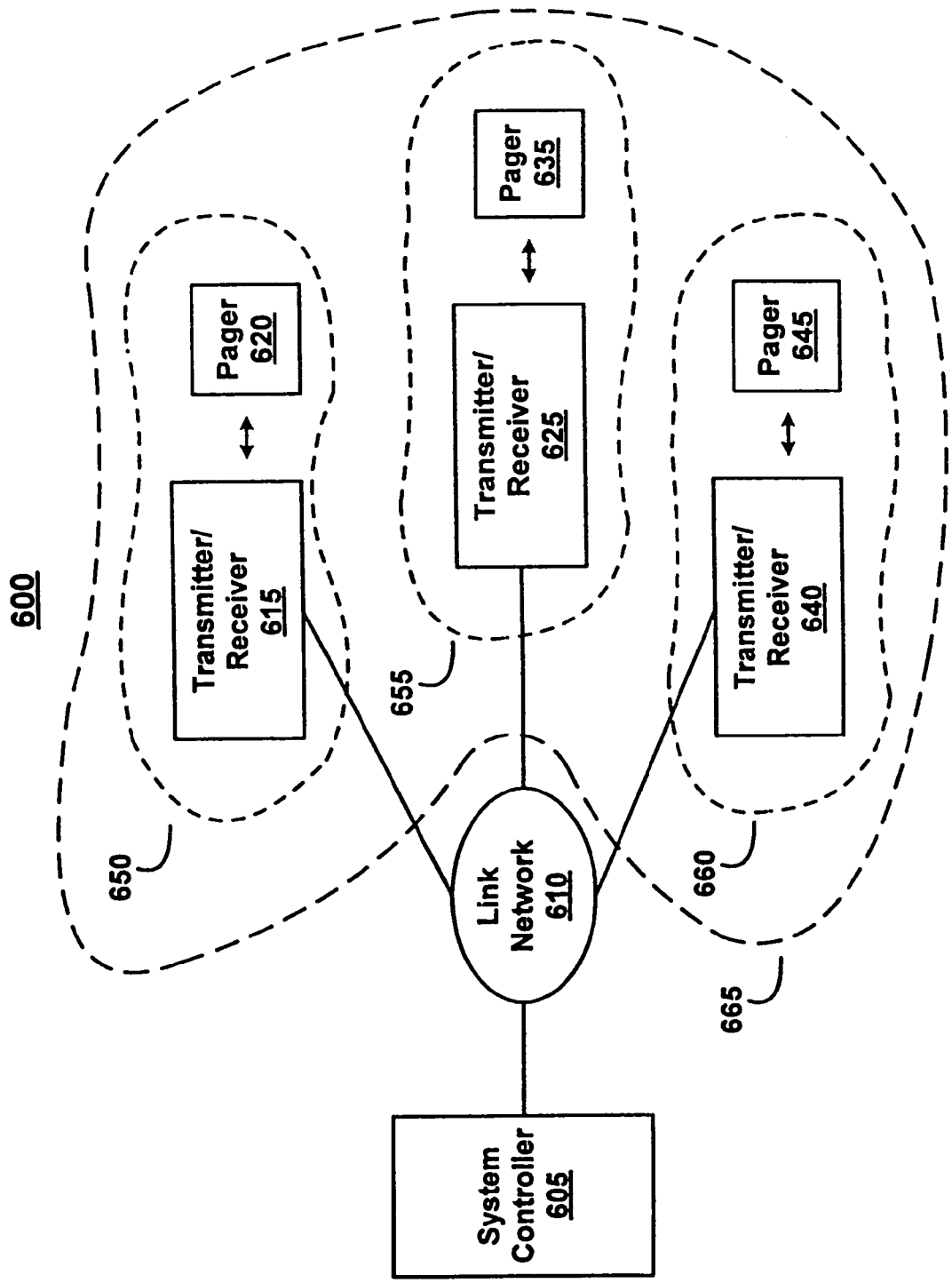
FIG. 6 is a block diagram of a paging system with overlapping zones using a single frequency, in accordance with one embodiment of the present invention.

FIG. 6 shows a paging system 600 with system controller 605 and link network 610 serving non-overlapping zones 650, 655, 660, and superzone 665, using a single frequency, in accordance with one embodiment of the present invention. This system is similar to the system shown in FIG. 4; however, the system controller 605 coordinates the transmitters in zones 650, 655 and 660 so that message delivery is divided into two time periods.

In the first time period used for local service area users, messages are transmitted independently in each of the zones as is done in the system of FIG. 4. In the second time period used for wide area users, the same message is transmitted simultaneously in all three zones. Depending upon the balance of messages between local and wide area users, the transmission time dedicated to the first and second periods can be dynamically adjusted.

Geofencing Mobile Transmissions

Accordingly, various embodiments of the present invention disclose a method and system for geofencing mobile transmissions. As a result, embodiments of the present invention are capable of allowing transmission from mobile transmitters that provide a level of protection from cochannel interference to licensed users within a geographic area. In addition, embodiments of the present invention provide the above accomplishments and also provide for mobile paging broadcasts over a specific cochannel that does not interfere with paging signals over a specific licensed channel within a geographic BEA or service area. Further embodiments of the present invention provide the above accomplishments and also provide for communication over under-utilized low band VHF frequencies.

While embodiments of the present invention are described in relation to fixed site class systems, other embodiments of the present invention are well suited to the avoidance of interference with licensed transmissions in geographic areas, such as Basic Economic Areas (BEAs), as previously described. That is, embodiments of the present invention are well suited to avoiding interference with licensed transmissions within areas defined by fixed site class systems or BEA class systems authorized by the FCC to broadcast throughout a paging geographic area on a specified channel.

Figure 7:
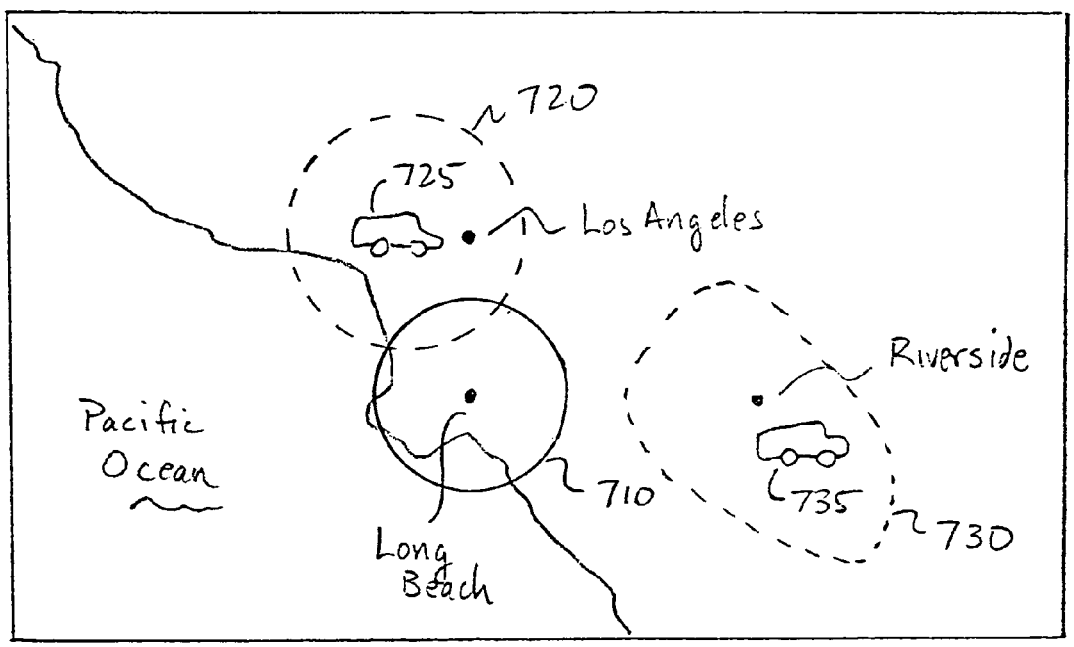
FIG. 7 is a map illustrating the operation of mobile transmitters inside and outside a service contour, in accordance with one embodiment of the present invention.

FIG. 7 is a map 700 illustrating mobile transmissions that do not interfere with other licensed transmissions in areas authorized by the FCC, in accordance with one embodiment of the present invention. Map 700 illustrates a fixed site transmitter in an area defined by the city of Long Beach and its surroundings in southern California. The service area associated with the fixed site transmitter near Long Beach grants the holder of an associated FCC license to establish and expand stations throughout the service area for the purpose of transmissions over a specified channel.

As shown in FIG. 7, the service area can be defined as a circle, or a service contour 710. The service contour 710 is defined as the locus of points surrounding a transmitter where the predicted median filed strength of the signal from that transmitter is the minimum field strength that is considered sufficient to provide reliable service to its customers (e.g., mobile stations in a paging network).

The service contour 710 can be determined by calculating the distance along cardinal radials. In FIG. 7, without any geographic barriers, the service area is essentially a circle. In areas with geographic barriers, the service area can take on any shape. The distance "d" that is calculated along each cardinal radial is defined in Equation 1, as follows:

$$d=1.243(h^{0.40})(p^{0.20}) \qquad (1)$$

In equation 1, the distance "d" is the radial distance in kilometers, the variable "h" is the radial antenna height above average terrain (HAAT) in meters, and the variable "p" is the radial effective radiated power (ERP) in Watts. If the actual HAAT is less than 30 meters, the value of 30 is used as a minimum for the value of "h".

Also shown in FIG. 7 are two mobile transmitters. Mobile transmitter 725 is operating near Los Angeles. Mobile transmitter 735 is operating near Riverside. The mobile transmitters are associated with interference contours. For instance, mobile transmitter 725 has an associated interference contour 720, and mobile transmitter 735 has an associated interference contour 730.

The interference contour is defined as the locus of points surrounding a transmitter where the predicted median field strength of the signal from that transmitter is the maximum field strength that is not considered to cause interference at the service contour of another licensed transmitter. In general, the interference contours calculated along cardinal radials is defined in Equation 2, as follows:

$$d=6.509((h^{0.28})(p^{0.17}) \qquad (2)$$

From the map 700, it can be seen that the interference contour 730 of the mobile transmitter 735 does not extend into or overlap with the service area as defined by the service contour 710 of the fixed site transmitter near Long Beach. No issues of interference arise, and the mobile transmitter 735 is free to operate without interfering with the service area as defined by service contour 710. On the other hand, interference contour 720 of the mobile transmitter 725 extends or overlaps into the service area as defined by service contour 710 of the fixed site transmitter near Long Beach. Possible interference within the service area as defined by service contour 710 may occur when the mobile transmitter 735 is transmitting over the same frequency as the fixed site transmitter near Long Beach. Embodiments of the present invention are capable of avoiding interference by mobile transmissions from the mobile transmitter 725 in the service area as defined by service contour 710, as will be fully explained below.

Figure 8:
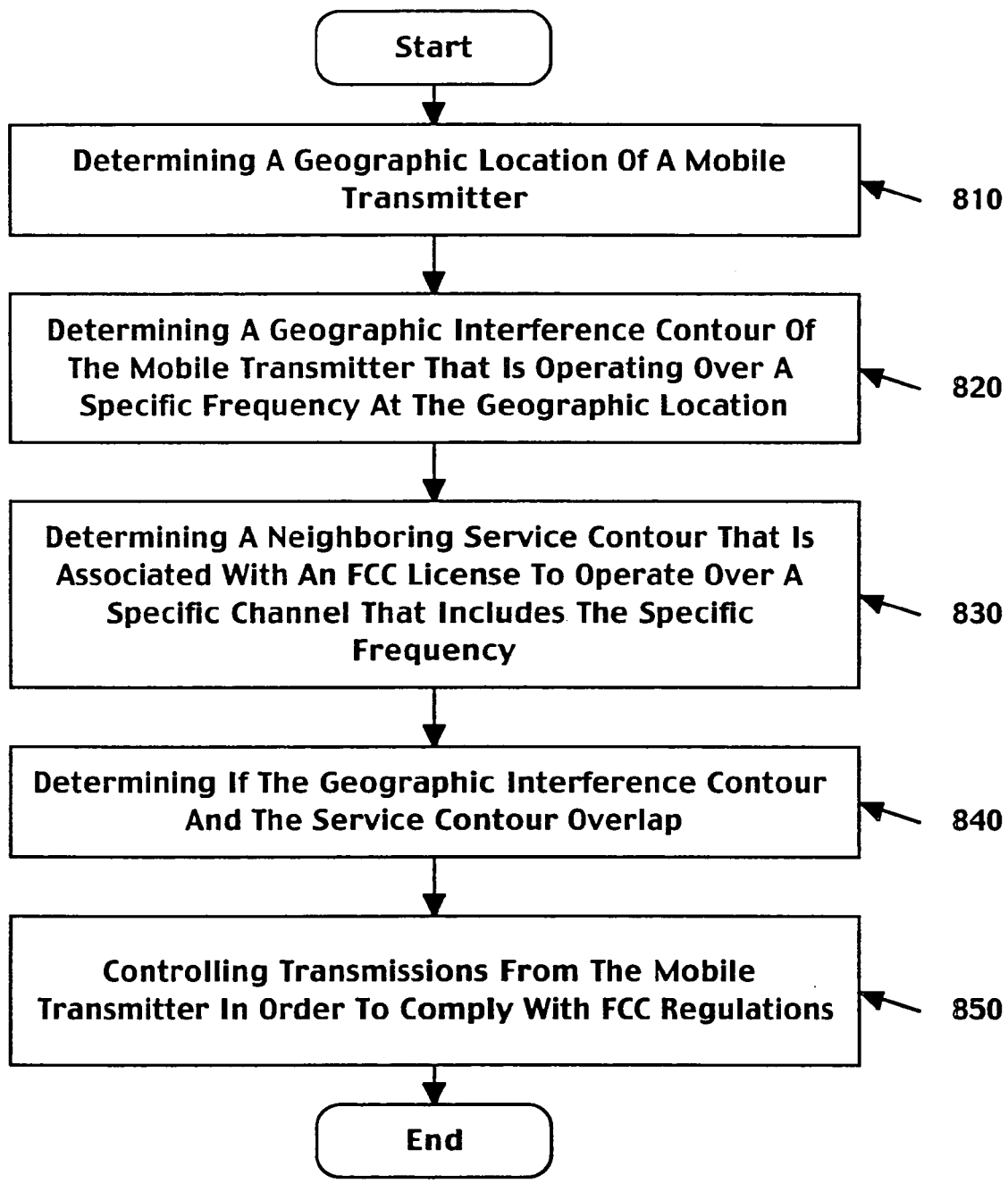
FIG. 8 is a flow chart illustrating steps in a method for geofencing mobile transmissions that avoids transmissions when an interference contour overlaps with a service contour, in accordance with one embodiment of the present invention.

Referring now to FIG. 8, a flow chart 800 is disclosed illustrating steps in a computer implemented method for geofencing mobile transmissions, in accordance with one embodiment of the present invention. More specifically, the flow chart 800 is capable of avoiding interference with licensed transmissions over specified channels allocated for assignment throughout a geographic area (e.g., BEA), or a service area that is associated with a fixed site transmitter.

The present embodiment is capable of allowing a mobile transmitter to transmit without interfering with FCC licensed transmitters authorized to transmit throughout a geographic area, such as a paging geographic area defined by a BEA, or service area. The present embodiment begins by determining a geographic location of a mobile transmitter, at 810. For instance, a global positioning satellite (GPS) receiver located at the mobile transmitter may provide information pertaining to the geographic location of the mobile transmitter.

In addition, at 820, the present embodiment determines a geographic interference contour of the mobile transmitter. This interference contour is calculated assuming, in part, that the mobile transmitter is operating over a specific frequency at the previously determined geographic location of the mobile transmitter, at a particular elevation. An onboard digital elevation model may be used to calculate elevation of the mobile transmitter. Other current operating parameters are also taken into account when calculating the interference contour, such as, but not limited to, directional power of the antenna, height of the antenna, geography of surrounding areas, etc.

At 830, the present embodiment then determines a neighboring service contour. The neighboring service contour is sufficiently close that interference from the mobile transmitter may occur. In one embodiment, the neighboring service contour is associated with an FCC license to operate over a specific channel that includes the specific frequency, in one embodiment, for example. In another embodiment, the neighboring service contour is an independent and/or arbitrary service contour that may or may not be operating under an FCC license.

In one embodiment, a database is accessed that includes geographic locations of the neighboring service contour. That is, when operating in a particular region, the mobile transmitter is able to access a database that includes geographic coordinates defining service contours and their corresponding service areas or BEA geographic areas within which possible interference may occur.

At 840, the present embodiment determines if the geographic interference contour and the neighboring service contour overlap. That is, the present embodiment determines if the geographic interference contour encroaches upon the neighboring service contour overlap bringing up possible issues of interference over the same frequency.

At 850, the present embodiment controls transmissions from the mobile transmitter in order to comply with FCC regulations, if necessary. More specifically, one embodiment ensures that transmissions from the mobile transmitter do not interfere with service provided under the FCC license in a geographic area defined by the neighboring service contour. Another embodiment ensures that transmissions from the mobile transmitter do not interfere with service provided in the geographic area defined by the independent and/or neighboring service contour that may or may not be operating under an FCC license.

In one embodiment, the service that is protected from interference is the transmission of signals over a channel, such as the transmission of paging signals. As such, the embodiment provides a means for allowing mobile transmitters to use paging frequencies (e.g., one way paging frequencies) that do not cause interference to other licensed cochannel users.

In another embodiment, the service that is protected from interference is the customer receipt of the transmission of signals, such as paging signals. As such, the embodiment provides a means for allowing mobile transmitters operating under the control of a paging licensee to user paging frequencies (e.g., one way paging frequencies) that do not interfere with subscribers to the paging service. For instance, in one embodiment the service provider controlling the mobile transmitter is also the holder of the FCC license authorizing licensed transmissions within an area defined by the service contour are the same entity. That is, the mobile transmitter is operating within a co-owned FCC authorized area that is defined by a service contour. As such, the paging service is able to provide further services (e.g., one way paging from mobile transmitters) to its paging customers.

In one embodiment, if it is determined that the geographic interference area overlaps with the neighboring service contour, then transmissions are disabled from the mobile transmitter. In this case, the mobile transmitter suspends all transmissions so that interference does not occur from the mobile transmitter over a channel transmitting within an area defined by the neighboring service contour. In one case, the channel is associated with an FCC license granting permission to operate over that channel within the neighboring service contour. The mobile transmitter suspends all transmissions until the interference contour associated with the mobile transmitter does not overlap with the neighboring service contour.

In another embodiment, if it is determined that the geographic interference area does not overlap with the neighboring service contour, then transmissions are enabled from the mobile transmitter. That is, as long as the geographic interference area does not encroach into an area defined by the neighboring service contour, there is no possibility of interference over the same frequency of transmission from the mobile transmitter and the transmitter or transmitters associated with the neighboring service contour. As such, the present embodiment would allow the mobile transmitter to transmit.

As a result, the present embodiment is able to determine if transmissions from a mobile transmitter will be interfering with transmissions from a licensed transmitter over a geographic area (BEA) or fixed site service area. Accordingly the present embodiment is able to provide GPS geofencing of the mobile transmissions by enabling transmissions or disabling transmissions as appropriate.

In another embodiment, interference with other cochannel users (e.g., licensed cochannel users) is avoided by altering parameters affecting the transmission of the mobile transmitter. These parameters affect the transmission of signals from the mobile transmitter, such as power, antenna height, setting the directional field of the transmitted signal, etc. For example, the transmitted power may be altered to change the outline of the interference contour associated with the mobile transmitter. In that way, the size of the interference contour may be decreased so that it does not overlap with any neighboring service contours.

In a preferred embodiment, the level of power adjustment covers the range from 1% to 100% of available transmit power in as fine a step size as may be desired. For example, a practical implementation may include 3 dB step size adjustments from 0 dB attenuation (zero dB loss of transmit power, or 100% of available power) to 20 dB reduction in transmit power (1% of available power), in 3 dB steps. In another preferred embodiment, the adjustment range is limited to larger step sizes with fewer steps, such as 6 dB or 10 dB. In a further preferred embodiment, the reduction in power extends to 30 dB from the available power.

In another embodiment, interference with licensed cochannel users is avoided by limiting transmissions from the mobile transmitter to specific periods of time that do not interfere with transmissions of signals associated with other cochannel users (e.g., licensed cochannel users). As such, the transmissions from the mobile transmitter would not interfere with service provided under a FCC license in an area defined by a neighboring service contour.

That is, in one embodiment, if knowledge of transmit times from the controlling licensee is possible, then time of transmission can be used to avoid interference between transmissions by the mobile transmitter and the licensed transmitter associated with the neighboring service contour. That is, the present embodiment implements time-sharing based on knowledge of the fixed transmitter used for the paging network to implement time division multiple access (TDMA).

In an embodiment, knowledge of transmit times from the controlling licensee is possible if one owner controlled the fixed transmitter used for the paging network and the mobile transmitter. In another embodiment, knowledge of the transmit times is available through an arrangement between the owner of the fixed transmitter used for the paging network and the owner of the mobile transmitter.

For example, in the case where the mobile transmitter has its interference contour within the service contour of a controlling licensee, the controlling licensee under agreement (e.g., through coownership or contract) can send messages or pages to the mobile units in the paging geographic area defined by its service contour outlining times of noninterference. That is, time slots would be provided to mobile transmitters so that transmissions in those time slots would not interfere with the primary purpose of the controlling licensee, such as normal paging operations of sending pages to customers. Coordination of time is possible in one embodiment by using the same clock at both the mobile transmitters and the controlling licensee (e.g., one derived from GPS satellites).

In still another embodiment, the computer implemented method as described in flow chart 800 provides for one way paging systems by managing cochannel interference so that mobile transmitters can transmit without interfering with other licensed transmitters.

In another embodiment, the computer implemented method as disclosed in FIG. 8 is performed on a periodic basis. As such, the flow chart 800 is performed continually to provide an updated analysis of whether interference may occur from the mobile transmissions. Continual updating is important within the mobile environment as the mobile transmitter may be moving from one location to another. The period for calculating whether interference occurs is such that interference with other licensed transmitters would not occur no matter how quickly the mobile transmitter is changing locations.

While embodiments of the present invention are described in relation to avoiding interference with a single neighboring service contour that defines an area within which licensed transmissions are protected from interference, other embodiments are well suited to avoiding interference with one or more neighboring service contours that define neighboring areas within which licensed transmissions are protected from interference. In those cases, embodiments of the present invention are capable of determining whether interference over a specified frequency would occur within licensed transmissions within each of the neighboring service contours and act accordingly to avoid that interference.

Figure 9:
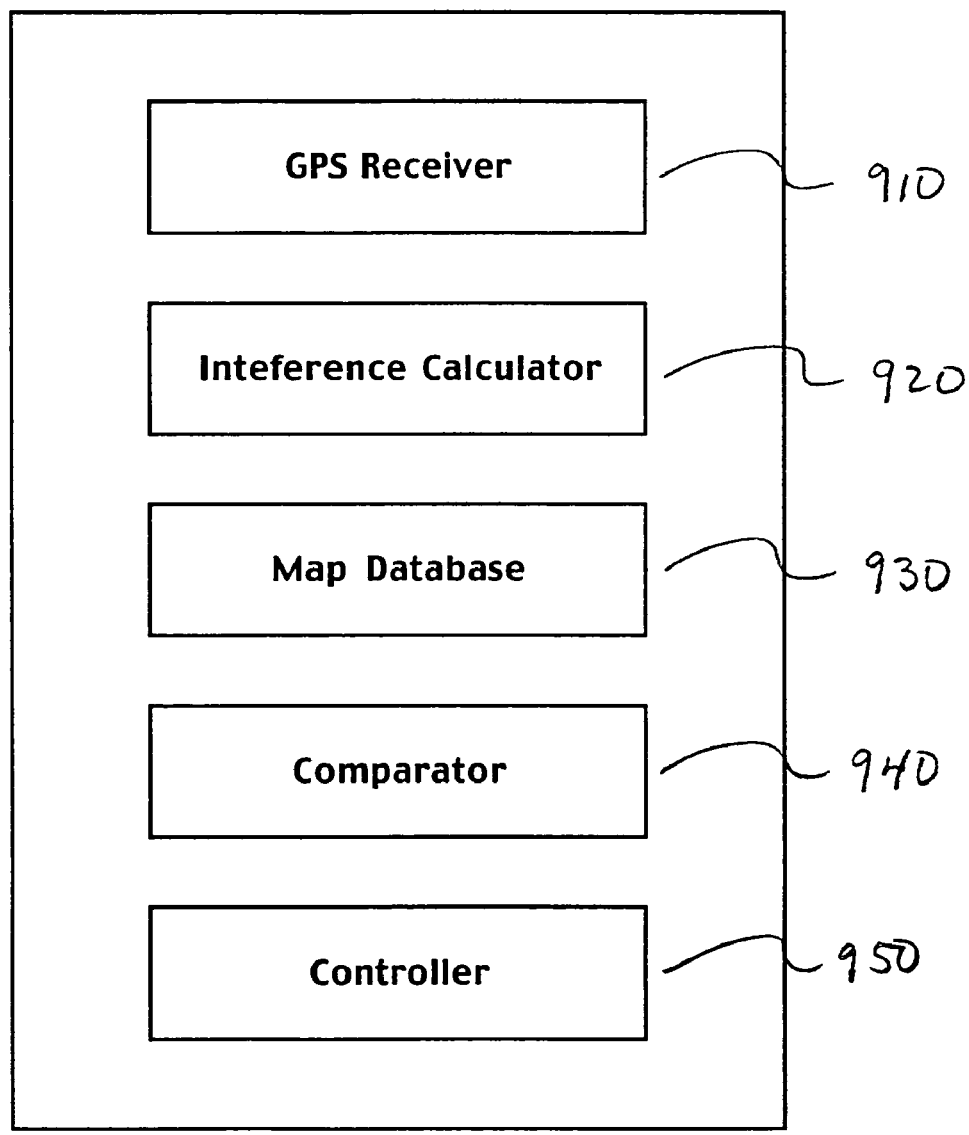
FIG. 9 is a block diagram of a system that is capable of geofencing mobile transmissions, in accordance with one embodiment of the present invention.

FIG. 9 is a block diagram illustrating a system 900 that is capable of GPS geofencing of mobile transmissions, in accordance with one embodiment of the present invention. The system is capable of avoiding interference with other licensed cochannel users that are authorized to transmit within areas defined by service contours, such as geographic based BEAs and service areas of fixed site transmitters. The system 900 comprises a global positioning receiver 910, an interference calculator 920, a map database 930, a comparator 940, and a controller 950. The system 900 can be co-located with the mobile transmitter in one embodiment to determine if the mobile transmitter may cause interference with other licensed cochannel users.

The global positioning receiver 910 determines a geographic location of a mobile transmitter. That is, the global positing receiver 910 determines the geographic coordinates of the mobile transmitter. For example, a GPS receiver is used to calculate geographic coordinates, in one embodiment.

The interference calculator 920 determines a geographic interference contour of the mobile transmitter associated with the system 900. The mobile transmitter is operating over a specific frequency at the location as determined by the global positioning receiver 910. As such, given the position of the mobile transmitter, an interference contour can be calculated by considering variables, such as elevation determined from an accessed onboard digital elevation model, the current geographic position, etc.

The system 900 also comprises a map database 930. The map database 930 includes locations for neighboring areas around the mobile transmitter. The map database 930 includes location points of service contours that define the neighboring areas (e.g., geographic BEAs, or service areas of fixed transmitters). The neighboring service contours outline areas where licensed holders are authorized to transmit over specific channels.

The system 900 also includes a comparator 940. The comparator 940 is able to determine if the geographic interference contour overlaps with any of the neighboring service contours. In that way, the comparator is able to determine if there is possible interference of transmissions from the mobile transmitter with other licensed cochannel users.

The system 900 also includes a controller 950 for controlling transmissions from the mobile transmitter in order to comply with FCC regulations. That is, in one embodiment, the controller 950 is able to disable transmissions from the mobile transmitter when the geographic interference contour overlaps with any of the neighboring service contour so that transmissions from the mobile transmitter do not interfere with licensed users of the cochannel frequency in areas defined by the overlapped neighboring interference contour.

In another embodiment, the controller is able to enable transmissions from the mobile transmitter when the geographic interference contour does not overlap with any of the neighboring service contours. In that case, transmissions from the mobile transmitter do not interfere with any licensed users of the cochannel frequency.

Figure 10:
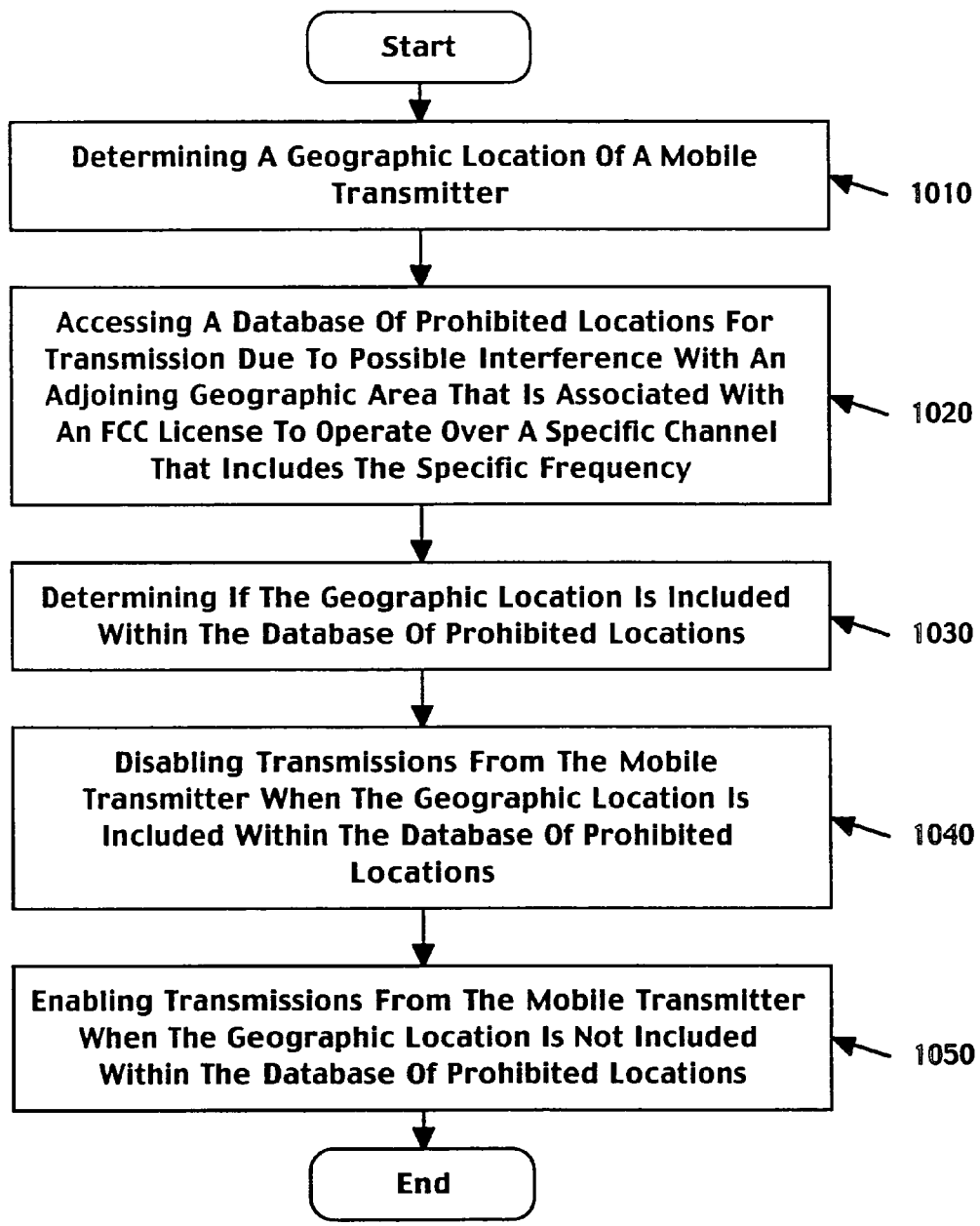
FIG. 10 is a flow chart illustrating steps in a method for geofencing mobile transmissions that avoids interference with a service contour by disabling transmissions made from a database of prohibited transmission locations, in accordance with one embodiment of the present invention.

FIG. 10 is a flow chart 1000 illustrating a computer implemented method for GPS geofencing of mobile transmissions, in accordance with one embodiment of the present invention. More specifically, the flow chart 1000 is capable of avoiding interference with licensed transmissions-over specified channels allocated for assignment throughout a geographic area (e.g., BEA), or a service area that is associated with a fixed site transmitter.

At 1010, the present embodiment determines a geographic location of a mobile transmitter. The geographic location may be determined from an accessed GPS receiver, or through any other means.

At 1020, the present embodiment accesses a database of prohibited locations for transmission from the mobile transmitter. The prohibited locations define areas where there may be possible interference within an adjoining geographic area that is associated with an FCC license to operate over a specific channel, to include the specific frequency over which the mobile transmitter is operating.

In one embodiment, the database of prohibited locations includes pre-calculated loci of positions about one or more areas (e.g., geographic BEAs, or service areas of fixed site transmitters) where the interfering contour from the mobile transmitter would be just tangent to the neighboring service contours that define the one or more geographic areas within which a licensed holder is authorized transmission over specified channels.

More specifically, the present embodiment pre-calculates a boundary within which any mobile transmitter may not transmit due to possible interference with other licensed cochannel users. The present embodiment pre-calculates the boundary using assumptions of interference contours of the mobile transmitters, such as power, antenna height, etc,.

At 1030, the present embodiment determines if the geographic location of the mobile transmitter is included within the database of prohibited locations. For instance, in the case where database defines the boundary, the present embodiment is able to determine which side of the boundary the geographic location is located.

At 1040, the present embodiment disables transmissions from the mobile transmitter when the geographic location is included within the database of prohibited locations. That is, the geographic location is in a position such that transmissions from the mobile transmitter may interfere with other cochannel users. For instance, in the case where the database defines a boundary, the present embodiment is able to determine when the geographic location is located on the side of the boundary that indicates that the geographic interference contour of the mobile transmitter will interfere with other licensed cochannel users. In particular, the geographic interference contour of the mobile transmitter will overlap with other neighboring service contours.

At 1050, the present embodiment enables transmissions from the mobile transmitter when the geographic location is not included within the database of prohibited locations. That is, the geographic location of the mobile transmitter is located on the side of the boundary that indicates the geographic interference contour of the mobile transmitter will not interfere other licensed cochannel users. In particular, the geographic interference contour of the mobile transmitter will not overlap with other neighboring service contours.

Conversely, in another embodiment of the present invention, the database could also consist of allowed locations. This database could be derived with the converse rules and methods. With such a database, if the geographic location of the mobile transmitter is included within the database, then the geographic interference contour of the mobile transmitter will not interfere with other licensed cochannel users in neighboring areas. As such, transmissions from the mobile transmitter are enabled.

Accordingly, various embodiments of the present invention disclose a method and system for geofencing mobile transmissions. As a result, embodiments of the present invention are capable of allowing transmission from mobile transmitters that provide a level of protection from cochannel interference to licensed users within a geographic area. In addition, embodiments of the present invention provide the above accomplishments and also provide for mobile paging broadcasts over a specific cochannel that does not interfere with paging signals over a specific licensed channel within a geographic BEA or service area. Further embodiments of the present invention provide the above accomplishments and also provide for communication over under-utilized low band VHF frequencies.

While the methods of embodiments illustrated in flow charts 800 and 1000 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

Embodiments of the present invention, a method and system for GPS geofencing of mobile transmissions have been described. While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

What is claimed is:

1. A method for geofencing mobile transmissions, comprising:

determining a geographic location of a mobile transmitter;

determining a geographic interference contour of said mobile transmitter that is operating over a specific frequency at said geographic location;

determining a neighboring service contour that is associated with an FCC license to operate over a specific channel that includes said specific frequency;

determining if said geographic interference contour and said neighboring service contour overlap; and controlling transmissions from said mobile transmitter in order to comply with FCC regulations.

2. The method of claim 1, wherein said determining a neighboring service contour comprises:

accessing a database comprising geographic locations of said neighboring service contour.

3. The method of claim 1, wherein said controlling transmissions further comprises:
controlling transmit power of transmissions from said mobile transmitter to avoid interference with service provided under said FCC license in a geographic area defined by said neighboring service contour.

4. The method of claim 3, wherein said service comprises transmission of paging signals.

5. The method of claim 3, wherein said service comprises customer receipt of the transmission of paging signals.

6. The method of claim 1, wherein said controlling transmissions further comprises:
disabling transmissions from said mobile transmitter when said geographic interference area and said neighboring service contour overlap; and
enabling transmissions from said mobile transmitter when said geographic interference area and said neighboring service contour do not overlap.

7. The method of claim 1, wherein said controlling transmissions further comprises:
altering parameters affecting said transmissions.

8. The method of claim 1, wherein said controlling transmissions further comprises:
limiting transmissions from said mobile transmitter to specific periods of time that do not interfere with transmissions of signals associated with service provided under said FCC license in an area defined by said neighboring service contour.

9. The method of claim 1, wherein a service provider controlling said mobile transmitter and a holder of said FCC license are the same entity.

10. A method for geofencing mobile transmissions, comprising:
determining a geographic location of a mobile transmitter;
determining a geographic interference contour of said mobile transmitter that is operating over a specific frequency at said geographic location;
determining a neighboring service contour that is associated with an FCC license to operate over a specific channel that includes said specific frequency;
determining if said geographic interference contour and said neighboring service contour overlap; and
disabling transmissions from said mobile transmitter when said geographic interference contour and said neighboring service contour overlap.

11. The method of claim 10, further comprising:
enabling transmissions from said mobile transmitter when said geographic interference contour and said neighboring service contour do not overlap.

12. The method of claim 10, wherein said mobile transmitter comprises a mobile pager transmitter.

13. The method of claim 10, wherein said determining an adjoining service contour comprises:
accessing a database comprising geographic locations of said neighboring service contour.

14. The method of claim 10, wherein said neighboring service contour defines a service area.

15. The method of claim 10, wherein said service contour defines a basic economic area (BEA).

16. A computer system comprising a processor and a computer readable memory coupled to said processor and comprising program instructions that, when executed, implement a method for geofencing mobile transmissions comprising:
determining a geographic location of a mobile transmitter;
determining a geographic interference contour of said mobile transmitter that is operating over a specific frequency at said geographic location;
determining a neighboring service contour that is associated with an FCC license to operate over a specific channel that includes said specific frequency;
determining if said geographic interference contour and said neighboring service contour overlap; and
controlling transmissions from said mobile transmitter in order to comply with FCC regulations.

17. The computer system of claim 16, wherein said determining an adjoining service contour in said method comprises:
accessing a database comprising geographic locations of said neighboring service contour.

18. The computer system of claim 16, wherein said controlling transmissions in said method further comprises:
controlling transmit power of transmissions from said mobile transmitter to avoid interference with service provided under said FCC license in a geographic area defined by said neighboring service contour.

19. The computer system of claim 18, wherein said service comprises transmission of paging signals.

20. The computer system of claim 18, wherein said service comprises customer receipt of the transmission of paging signals.

21. The computer system of claim 16, wherein said controlling transmissions in said method further comprises:
disabling transmissions from said mobile transmitter when said geographic interference area and said neighboring service contour overlap; and
enabling transmissions from said mobile transmitter when said geographic interference area and said neighboring service contour do not overlap.

22. The computer system of claim 16, wherein said controlling transmissions in said method further comprises:
altering parameters affecting said transmissions.

23. The computer system of claim 16, wherein said controlling transmissions in said method further comprises:
limiting transmissions from said mobile transmitter to specific periods of time that do not interfere with transmissions of signals associated with service provided under said FCC license in an area defined by said neighboring service contour.

24. The computer system of claim 16, wherein a service provider controlling said mobile transmitter and a holder of said FCC license are the same entity.

25. A method for geofencing mobile transmissions, comprising:
determining a geographic location of a mobile transmitter;
determining a geographic interference contour of said mobile transmitter that is operating over a specific frequency at said geographic location;
determining a neighboring service contour;
determining if said geographic interference contour and said neighboring service contour overlap; and
controlling transmissions from said mobile transmitter to avoid an overlap of said geographic interference contour and said neighboring service contour to comply with a communication regulation associated with a communication license associated with said neighboring service.

26. The method of claim 25, wherein said neighboring service contour is associated with an FCC license to operate over a specific channel that includes said specific frequency.

27. The method of claim 26, wherein said controlling transmissions is performed in order to comply with FCC regulations.

28. The method of claim 25, wherein said determining a neighboring service contour comprises:

accessing a database comprising geographic locations of said neighboring service contour.

29. The method of claim 25, wherein said controlling transmissions further comprises:

controlling transmit power of transmissions from said mobile transmitter to avoid interference with service provided in a geographic area defined by said neighboring service contour.

30. The method of claim 29, wherein said service comprises transmission of paging signals.

31. The method of claim 29, wherein said service comprises customer receipt of the transmission of paging signals.

32. The method of claim 25, wherein said controlling transmissions further comprises:

disabling transmissions from said mobile transmitter when said geographic interference area and said neighboring service contour overlap; and enabling transmissions from said mobile transmitter when said geographic interference area and said neighboring service contour do not overlap.

33. The method of claim 25, wherein said controlling transmissions further comprises:

altering parameters affecting said transmissions.

34. The method of claim 25, wherein said controlling transmissions further comprises:

limiting transmissions from said mobile transmitter to specific periods of time that do not interfere with transmissions of signals associated with service provided under said FCC license in an area defined by said neighboring service contour.

* * * * *

UNITED STATES PATENT AND TRADEMARK OFFICE
CERTIFICATE OF CORRECTION

PATENT NO. : 7,668,562 B1
APPLICATION NO. : 10/829125
DATED : February 23, 2010
INVENTOR(S) : Longaker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1705 days.

Signed and Sealed this

Seventh Day of December, 2010

David J. Kappos
*Director of the United States Patent and Trademark Office*